UNITED STATES PATENT OFFICE.

EDWARD D. KENDALL, OF BROOKLYN, NEW YORK.

PROCESS OF EXTRACTING PRECIOUS METALS FROM THEIR ORES.

SPECIFICATION forming part of Letters Patent No. 702,305, dated June 10, 1902.

Application filed February 27, 1901. Serial No. 49,096. (No specimens.)

*To all whom it may concern:*

Be it known that I, EDWARD D. KENDALL, of the borough of Brooklyn, in the city and State of New York, have invented a new and useful Improvement in Processes of Extracting Precious Metals from Their Ores, of which the following is a full, true, and exact description.

My invention relates to methods of obtaining gold and silver by lixiviation of ores with chemical solutions, particularly aqueous solutions containing a cyanid, and to a combination of matter therefor; and the object of my invention is to produce and use a compound aqueous solution which, while comparatively inexpensive and easily prepared, shall act on ores carrying precious metal or metals with greater energy than do aqueous solutions of cyanid alone, thereby extracting greater percentages of the ore values and lessening the time required for operations.

My invention consists in preparing and using as a lixiviating solution on the ore a solution composed of water, potassium cyanid, (or other suitable cyanid,) and potassium percarbonate. I do not confine myself to any particular method of forming this combination of chemicals, but prefer simply to add potassium percarbonate, preferably dissolved in water, to an aqueous solution of potassium cyanid. Within wide limits the relative quantities of cyanid and percarbonate are not essential to the required chemical action on gold and silver ores, which is not prevented by an excess of either chemical; but I propose to use from one-tenth to one-fourth as much of the percarbonate as of the cyanid, according to the nature and value of the ore under treatment, the degree of pulverization, the temperature at any period in the operation of leaching, and the strength of the solution, which may contain any required quantity of cyanid, as well as of percarbonate, but usually would have from one-tenth of one per cent. to one-half of one per cent., by weight, of potassium cyanid.

In conducting my process I first granulate the ore by any of the usual means, but preferably by means of rolls when the ore is of a sliming character, then transfer the ore to any of the well-known forms of leaching-tanks that may be preferred, and then turn into the leaching-tank a sufficient quantity of my chemical solution consisting of water, potassium cyanid, and potassium percarbonate. After this solution shall have acted on the ore during a period to be determined by experience (which period will vary with different ores and circumstances) the solution is to be drawn off from the ore, as well as the water used in such subsequent washing of the ore as shall be deemed expedient, and this liquid, carrying precious metal in solution, is then to be conducted through the so-called "zinc-boxes" or submitted to electrolysis or treated by any preferred process in order to extract the gold and silver, or both metals, in reguline form.

What I claim as my invention, and desire to secure by Letters Patent, is—

1. The process of treating ores carrying precious metals, which consists in treating such ore with a lixiviating solution, consisting of a cyanid, potassium percarbonate and water, substantially as described.

2. The process of treating ores carrying precious metals, which consists in treating such ore with a lixiviating solution, consisting of a cyanid, potassium percarbonate, and water, and finally extracting the precious metal from such lixivium, substantially as described.

3. The process of treating ores carrying precious metals which consists in treating such ore with a lixiviating solution, consisting of potassium cyanid, potassium percarbonate and water, substantially as described.

4. The process of treating ores carrying precious metals which consists in treating such ore with a lixiviating solution, consisting of a cyanid of substantially from one-tenth to one-half per cent. by weight, potassium carbonate and water.

In testimony whereof I have signed my name to this specification in the presence of two subscribing witnesses.

EDWARD D. KENDALL.

Witnesses:
JULIUS J. SUCKERT,
CHARLES S. JONES.